United States Patent

[11] 3,553,463

[72] Inventors Partap C. Dhir
Penfield;
Elliot H. Woodhull, Rochester, N.Y.
[21] Appl. No. 685,591
[22] Filed Nov. 24, 1967
[45] Patented Jan. 5, 1971
[73] Assignee Xerox Corporation
Rochester, N.Y.
a corporation of New York

[54] RADIATION SENSITIVE DOCUMENT SCANNING APPARATUS USING HELICAL SCANNER
3 Claims, 4 Drawing Figs.

[52] U.S. Cl. .......... 250/219, 356/71; 178/7.6
[51] Int. Cl. .......... G06k 9/00
[50] Field of Search .......... 250/219, 236, 228, 234, 233; 178/7.6, 7.7; 356/167, 71

[56] References Cited

UNITED STATES PATENTS

| | | | |
|---|---|---|---|
| 1,897,219 | 2/1933 | Schroter | 250/228X |
| 2,398,238 | 4/1946 | McNatt | 250/219X |
| 2,371,963 | 3/1945 | LaPierre | 250/219 |
| 2,871,369 | 1/1959 | Williams, Jr. | 250/236X |
| 3,055,582 | 9/1962 | Battison et al. | 250/219X |
| 3,170,032 | 2/1965 | Evans, Jr. et al. | 178/7.6X |

*Primary Examiner*—Walter Stolwein
*Attorneys*—Ronald Zibelli, James J. Ralabate and Norman E. Schrader

ABSTRACT: Apparatus for scanning a document in which a document is supported on a support member and flood illuminated at a scanning station as it is advanced in relation thereto. The illuminated image of the document is directed at the scanning apparatus by a lens system and cut into a line of light by an aperture in an opaque plate. Increments of the line of light thus generated are metered to within an opaque tubular light collection member by an opaque rotating Cylinder having a transparent helical aperture therein. The opaque tubular collection member is mounted within the rotating cylinder and includes a transparent aperture therein which is optically aligned with the line cutting aperture. Light thus metered to within the collection member is reflected to photomultipliers located at either end thereof by the interior reflecting surface of the collection member. The photomultiplier tubes are spaced from either end of the transparent aperture and operatively connected to provide an additive uniform output signal generated thereby.

INVENTORS
PARTAP C. DHIR
ELLIOT H. WOODHULL
BY Ronald Zibelli
ATTORNEYS

INVENTORS
PARTAP C. DHIR
ELLIOT H. WOODHULL
BY Ronald Zibelli
ATTORNEYS

RADIATION SENSITIVE DOCUMENT SCANNING APPARATUS USING HELICAL SCANNER

BACKGROUND OF THE INVENTION

This invention relates generally to recording and scanning apparatus and more particularly to improved facsimile recording and scanning apparatus of the mechanical type employing the combination of helical and linear elements. This technique utilizes the scanning effect resulting from the intersection of a straight slit aperture and a rotating drum containing a helical aperture. As the drum rotates, incremental bits of information are gated to within the drum.

Mechanical scanning techniques as relating to facsimile equipment are generally known, as are the use of the combination of helical and linear elements. However, heretofore, these helical drum scanning techniques have found only limited utilization due largely to the inability to direct the light from within the drum onto a light sensitive device efficiently and uniformly. Because of these physical limitations of helical scanners and shortcomings in other types of mechanical scanning apparatus, it has therefore been necessary in many instances to utilize cathode ray tubes as scanning devices in many facsimile systems. These cathode ray tube systems have proven extremely effective because of the versatility thereof as well as the adaptability to techniques utilized in bandwidth compression. The most serious drawback to the cathode ray tube system, however, has been the inherent complexity which results in a higher cost of the facsimile equipment.

In some known mechanical scanning apparatus, a light spot is directed upon the copy and the light which is reflected therefrom utilized to actuate a photoelectric cell. In such a system, since the only illumination on the document is the scanning spot itself, any light leaks in the exposure area produce a significant effect on the video signal level. It has been found that by operating the system in reverse this adverse effect can be greatly minimized. That is, by flooding the document with light and mechanically gating a spot thereof at the scanning device, any small amount of ambient light falling on the document produces insignificant effects on the video signal.

Other scanning techniques have involved utilizing light transmitted through the copy sheet. In these devices a lamp may be placed on one side of the copy sheet, and scanning accomplished at the intersection between a helical aperture in a rotating drum and a linear stationary aperture, both on the opposite side of the copy sheet from the lamp. Light entering the scanning aperture is then detected by photoelectric cells mounted at the ends of the drum and an electrical signal is generated thereby according to the scanned information.

While helical slit scanners in many respects comprise desirable scanning devices and have proven satisfactory for some types of facsimile equipment, they have heretofore not found extended usage in most facsimile systems largely due to the inefficiency of the light collecting apparatus, and the nonuniformity with which light is directed to the light sensing means.

Previous attempts to improve such devices have included utilization of a parabolic deflecting surface within the drum to direct the light to a photomultiplier tube at the parabolic focus. While such arrangements generally exhibit improved efficiency, the uniformity nevertheless remains extremely poor.

Another approach has been the use of a straight light conductive rod of a material such as Lucite placed along the axis of the drum for transmitting light to a photomultiplier tube. While this technique improves the uniformity characteristics, the efficiency of such system is very poor.

SUMMARY OF THE INVENTION

Accordingly, it is an object of the invention to improve the efficiency and uniformity of helical scanning apparatus.

It is another object of the present invention to provide improved scanning apparatus which yields a more uniform output across the length of scan.

It is still another object of the invention to provide improved helical scanning apparatus which is effective for high speed scanning, yet which is small, compact, and inexpensive.

It is yet a further object of the invention to provide improved light collecting apparatus in a mechanical helical scanner.

These and other objects of the invention are attained by apparatus wherein a document to be scanned is flood illuminated at a scanning station as it is advanced in relation thereto. The illuminated image of information is directed at the scanning apparatus by a lens system and cut into a line of light by a transparent aperture in an opaque plate. Increments of the line of light thus generated are metered to within an opaque tubular light collection member by an opaque rotating cylinder having a transparent helical aperture therein. The opaque tubular collection member is mounted within the rotating cylinder and includes a transparent aperture therein which is optically aligned with the line cutting aperture. Light within the collection member is reflected to a pair of photomultiplier tubes located at either end thereof by the interior reflecting surface of the collection member. The photomultiplier tubes are spaced from either end of the transparent aperture and operatively connected to provide an additive uniform output signal generated thereby.

DESCRIPTION OF THE PREFERRED EMBODIMENTS

Figure 1:
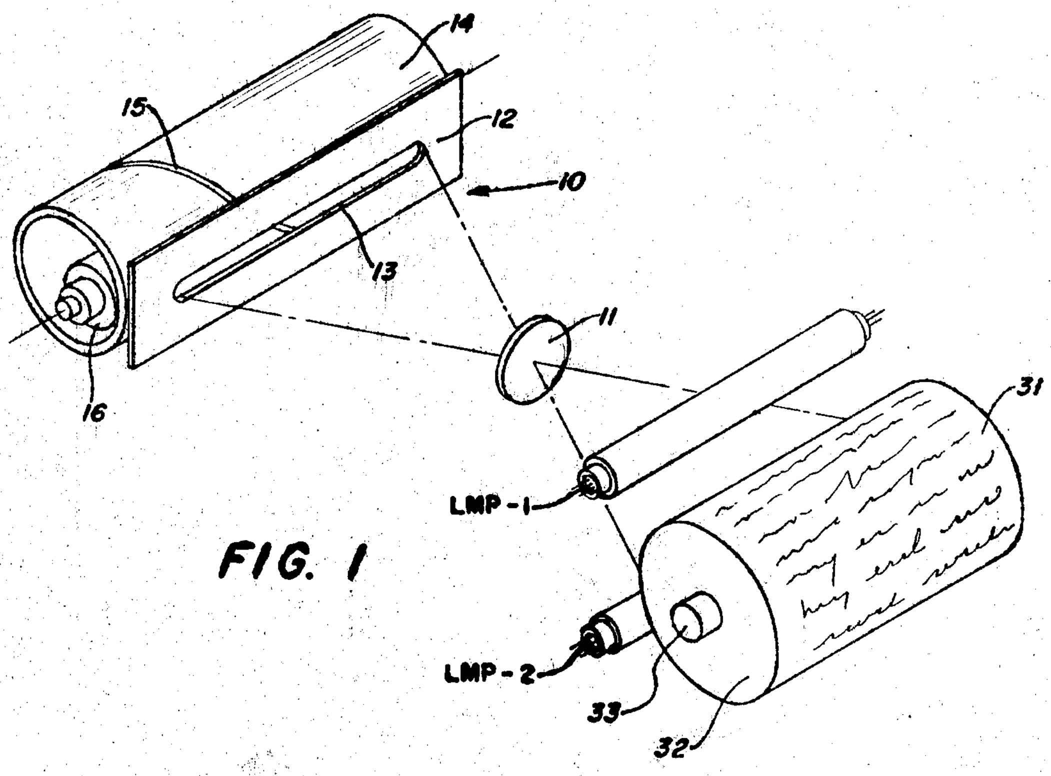
FIG. 1 is a schematic perspective view of one embodiment of the improved scanning system.

With reference to FIG. 1, a document 31 which is to be scanned in a manner according to the present invention, may be supported on a rotatable drum member 32 which rotates about an axis 33. A pair of lamps LMP-1 and LMP-2 are positioned to flood illuminate the document as the document is advanced. The illuminated portion of the document is projected to the scanning apparatus generally designated 10 by a suitable lens arrangement 11 in a pattern of light and dark areas corresponding to the information on document 31.

At the scanning apparatus, the projected pattern of information is cut into a narrow line of light by an aperture 13 in aperture plate 12. In the preferred embodiment, aperture 13, along the narrow dimension thereof, may have an order of magnitude of 2 mils, depending on the resolution desired. Aperture plate 12 preferably comprises a piece of transparent plastic material, for example, Lucite. Aperture 13 in the preferred embodiment is preferably formed by masking aperture plate 12 with an opaque material such as exposed photographic film for example. A photographic film is exposed in a configuration corresponding to the desired size of aperture and thereafter developed by conventional processing methods. Thus, in the exposed area, the film substrate is transparent, all of the film emulsion having been removed by the photographic developing process. However, in the unexposed areas surrounding the aperture the emulsion remains, leaving a dark opaque coating thereon. The film substrate is then bonded to aperture plate 12 by a suitable bonding agent. Inasmuch as aperture 13 is of extreme criticality in the scanning process, the formation of such an aperture by photographic processes affords much greater accuracy over more conventional manufacturing methods such as by machining an aperture in a metallic plate or the like and reduces the possibility of interference produced by dust, lint and other particles which may be accumulated in a slit.

Figures 2, 4:
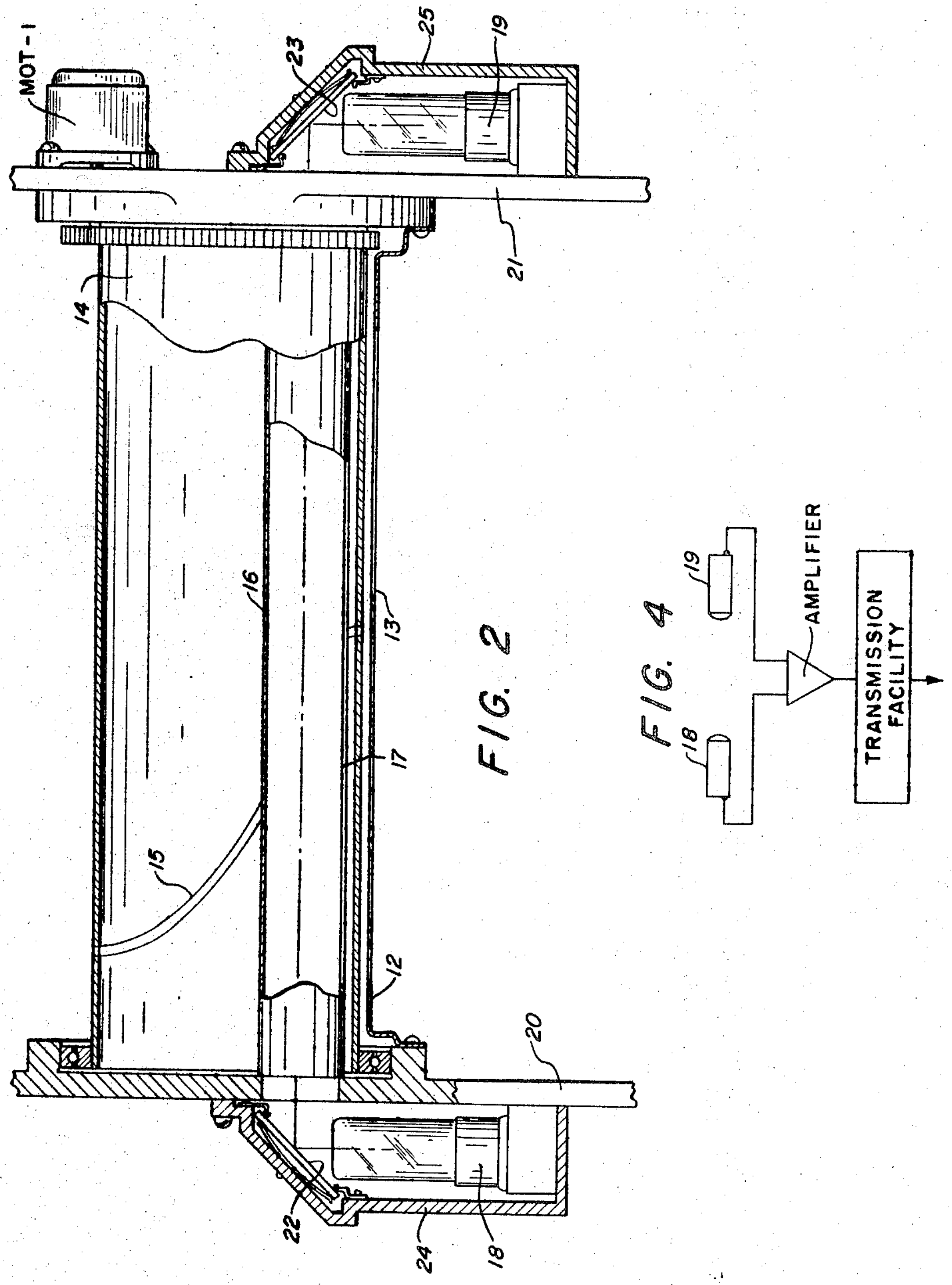
FIG. 2 is a plan sectional view of one embodiment of scanner according to the present invention.
FIG. 4 is a schematic illustration of the output circuit of the scanning apparatus.

A scanning drum 14, is positioned behind aperture plate 12 in the path of light cut by aperture 13. As illustrated in FIG. 2, cylindrical drum 14 is rotatably mounted in support members 20 and 21 and is adapted to be rotated by a power source such as motor MOT-1 via a suitable drive arrangement. A helical aperture 15 is formed in the circumferential periphery of scanning cylinder 14 for cutting the line of light projected through aperture 13 into a small spot of light. Aperture 15 is preferably formed in a manner similar to that used in forming aperture 13 in aperture plate 12. Thus, drum 14 preferably comprises a transparent plastic material such as Lucite, for example, which is covered with an opaque material such as exposed photographic film to form helical aperture 15. By utilizing known photographic processes, a helix can be formed which is much more accurate and efficient than those formed by mechanical machining methods.

The light collection apparatus according to the instant invention includes an opaque tubular light collection member 16 which is positioned within scanning cylinder 14. Collection member 16 is eccentrically positioned with respect to the axis of scanning cylinder 14 and extends axially within to either end of scanning cylinder 14. Collection member 16 includes an aperture 17 therein which is optically aligned with aperture 13 in aperture plate 12. In the preferred from of the invention, aperture 17 is optically transparent and the interior surface of collection member 16 is coated with a diffusely reflecting material to reflect the entering light to the ends of the collection member. Material such as magnesium carbonate has been found to work particularly well as a diffusely reflecting coating material within collection member 16. As an alternative, aperture 17 may be coated with a translucent material which diffuses the light before entering collection member 16. In this case a specular coating within collection member 16 has been found to work particularly well in reflecting the already diffused light to the photosensitive means.

A pair of photomultiplier tubes 18 and 19 are located at either end of collection tube 16. Photomultiplier tubes 18 and 19 may be positioned axially with respect to collection tube 16 as schematically illustrated in FIG. 1, or may be positioned perpendicular to the central axis of collection tube 16 as illustrated in FIG. 2. As illustrated in FIG. 2 a pair of mirrors 22 and 23 are mounted in housings 24 and 25 respectively to fold the optical path. Housings 24 and 25 are connected to support members 20 and 21 and enclose photomultiplier tubes 18 and 19 therein. Mirrors 22 and 23 thus fold the optical path from the central axis of collection tube 16 and direct the light therefrom onto photomultiplier tubes 18 and 19 respectively.

With reference to FIG. 4, photomultiplier tubes 18 and 19 are electrically coupled to produce an additive output therefrom. As schematically illustrated therein, photomultiplier tubes 18 and 19 are connected to amplifier AMP-1 which amplifies the signal thus obtained which in turn is transmitted to the transmission facility.

Thus it may be seen that information contained on document 31 is flood illuminated by lamps LMP-1 and LMP-2 and projected to aperture plate 12 by lens system 11. This projected image is accurately cut into a narrow line of light by aperture 13 which in turn is precisionally cut into a small spot of light by helix 15 in scanning cylinder 14. As scanning cylinder 14 is rotated, helix 15 advances along aperture 13. As helix 15 advances along aperture 13 the spot of light entering scanning cylinder 14 and collection tube 16 is in a pattern of light and dark areas which vary according to the information on document 31.

Figure 3:
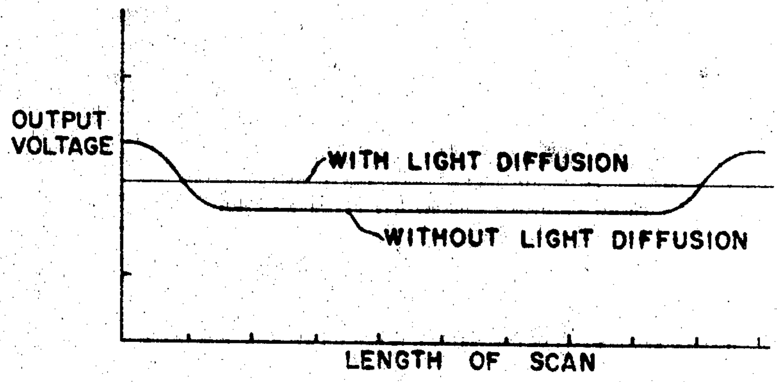
FIG. 3 is a comparative diagram of the output of the combined photomultiplier tubes according to the present invention.

A spot of light thus having entered collection tube 16 at a point equally distant from photomultiplier tubes 18 and 19 will be diffused and reflected by the surface therein onto each of photomultiplier tubes 18 and 19 with equal intensity. This impinging light pattern on photomultiplier tubes 18 and 19 produces an equal output at both photomultiplier tubes. The outputs of both photomultiplier tubes are additively combined and amplified to produce a reference level voltage output therefrom as seen in FIG. 3 at the center of scan. A spot of light entering, for example, near one end of aperture 17 will be reflected with greater intensity upon the nearest photomultiplier tube and with lesser intensity upon the opposite photomultiplier tube. This in turn produces a high voltage output at the nearest photomultiplier tube and a low voltage output at the opposite photomultiplier tube. However, by additively coupling both photomultiplier tubes as schematically illustrated in FIG. 4, and diffusing the light utilized, the outputs of both photomultipliers are combined to form an output voltage corresponding to the reference voltage which is produced by a spot of light entering at the center of scan. This arrangement thus results in a substantially uniform output voltage throughout the length of scan.

As may be seen in connection with FIG. 3, without diffusion of the light entering collection member 16, the output voltage produced by the additively coupled photomultiplier tubes does not remain uniform throughout the length of scan. Without diffusion of the light entering collection member 16, an increase in the output voltage is experienced toward the scan extremities. On the other hand, however, a substantially uniform output voltage is produced across the entire length of scan when the light entering collection member 16 is diffused.

While the invention has been described with reference to its preferred embodiments, it will be understood by those skilled in the art that various changes may be made and equivalents may be substituted for elements thereof without departing from the true spirit and scope of the invention.

We claim:

1. A facsimile scanning apparatus for scanning a document comprising in combination:

a support member adapted to support a document to be scanned illumination means for flood illuminating a document to be scanned;

drive means for advancing a document part said illumination means;

a rotatable cylindrical member having a helical aperture therein;

drive means for advancing said cylindrical member about the axis thereof;

means for projecting an image of an illuminated document onto said cylindrical member;

a stationary plate member interposed between said support member and said cylindrical member having a longitudinal aperture therein extending axially along said cylindrical member and optically aligned with a projected image of an illuminated document;

light collecting means within said cylindrical member optically aligned to receive light entering said cylindrical member through the intersection of said helical and longitudinal apertures, said light collecting means comprising an opaque tubular collection member extending axially within said cylindrical member, said collection member including an aperture therein optically aligned with the longitudinal aperture in said stationary plate member whereby entering light is reflected to the ends of said collection member; and photosensitive means comprising a pair of photomultiplier tubes, one tube being positioned adjacent each end of said cylindrical member to receive light reflected from said tubular collection member, said photosensitive means being electrically connected to produce a combined additive and substantially uniform output therefrom across the entire length of a scan.

2. Light collection apparatus for use in a facsimile scanning device of the type wherein a cylindrical member having a helical aperture therein is rotated past a longitudinal aperture in a stationary plate member to scan a document including:

an opaque tubular collection member extending axially within said cylindrical member, said collection member having a longitudinal aperture therein optically aligned with the aperture in said stationary plate member and a diffuse reflective coating on the inside surface thereof whereby entering light is reflected to the ends of said member;

photosensitive means positioned adjacent the ends of said cylindrical member in communication with said collection member for generating an electrical signal in response to impinging light patterns; and means electrically connecting said photosensitive means to produce a combined additive output therefrom.

3. Apparatus according to claim 2, said collection member having a diffuse reflective coating on the inside surface thereof whereby entering light is reflected to the ends of said member.